(12) United States Patent
Groves et al.

(10) Patent No.: US 7,500,000 B2
(45) Date of Patent: Mar. 3, 2009

(54) METHOD AND SYSTEM FOR ASSIGNING OR CREATING A RESOURCE

(75) Inventors: David W. Groves, San Jose, CA (US); Michael L. Lamb, San Jose, CA (US); Raymond M. Swank, San Jose, CA (US); Kevin J. Webster, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/739,136

(22) Filed: Dec. 17, 2003

(65) Prior Publication Data

US 2005/0138174 A1   Jun. 23, 2005

(51) Int. Cl.
    *G06F 15/173* (2006.01)
(52) U.S. Cl. .................. 709/226; 719/328; 707/8; 707/10; 707/100; 718/1; 711/100; 711/114; 711/163
(58) Field of Classification Search .......... 709/223, 709/224; 707/1, 100; 719/328; 714/6; 711/100, 711/163
    See application file for complete search history.

(56) References Cited

U.S. PATENT DOCUMENTS

| | | | |
|---|---|---|---|
| 6,044,369 A | 3/2000 | Black | |
| 6,266,679 B1 | 7/2001 | Szalwinski et al. | |
| 6,286,013 B1 | 9/2001 | Reynolds et al. | |
| 6,345,368 B1 | 2/2002 | Bergsten | |
| 6,389,432 B1 | 5/2002 | Pothapragada et al. | |
| 6,427,168 B1 | 7/2002 | McCollum | |
| 6,560,591 B1 | 5/2003 | Memmott et al. | |
| 6,697,924 B2* | 2/2004 | Swank | 711/163 |
| 6,769,022 B1* | 7/2004 | DeKoning et al. | 709/223 |
| 6,912,537 B2* | 6/2005 | Selkirk et al. | 707/100 |
| 7,043,738 B2* | 5/2006 | Mandal et al. | 719/328 |
| 7,191,358 B2* | 3/2007 | Fujibayashi | 714/6 |

(Continued)

FOREIGN PATENT DOCUMENTS

JP   11161431 A   4/1999

(Continued)

OTHER PUBLICATIONS

Groves, et al., U.S. Appl. No. 10/739,209, titled "Method and system for assigning a resource", filed Dec. 17, 2003, 24 pages plus 3 drawing sheets.

(Continued)

*Primary Examiner*—Dustin Nguyen
(74) *Attorney, Agent, or Firm*—David W. Victor; Konrad Raynes & Victor LLP

(57) ABSTRACT

An example of a method for assigning a resource (for example, storage) includes receiving a request for a resource, wherein the request includes a list of paths. This example also includes retrieving a HardwareAccount, Controller, and an AccessAuthorization object for a first path in the list of paths. This example further includes making an attach device request to a CIMOM for a first available resource, using the Controller and the AccessAuthorization object. This example also includes determining if the first available resource was successfully attached, and if so, recording the assignment as successful, and if not, rolling back all assignments for the first available resource that were previously recorded as successful. Another aspect of the invention is a method for creating at least one LUN.

13 Claims, 6 Drawing Sheets

U.S. PATENT DOCUMENTS

| | | | |
|---|---|---|---|
| 7,257,103 B2 * | 9/2007 | Yeh et al. | 709/224 |
| 2002/0013808 A1 | 1/2002 | Case et al. | |
| 2002/0087671 A1 | 7/2002 | Weisser, Jr. et al. | |
| 2002/0103889 A1 | 8/2002 | Markson et al. | |
| 2002/0107872 A1 | 8/2002 | Hudis et al. | |
| 2002/0112043 A1 | 8/2002 | Kagami et al. | |
| 2002/0184360 A1 | 12/2002 | Weber et al. | |
| 2003/0055808 A1 | 3/2003 | Bhat | |
| 2003/0055809 A1 * | 3/2003 | Bhat | 707/1 |
| 2003/0055933 A1 | 3/2003 | Ishizaki et al. | |
| 2003/0055943 A1 | 3/2003 | Kanai | |
| 2003/0093501 A1 | 5/2003 | Carlson et al. | |
| 2003/0093509 A1 | 5/2003 | Li et al. | |
| 2003/0115296 A1 | 6/2003 | Jantz et al. | |
| 2004/0243699 A1 * | 12/2004 | Koclanes et al. | 709/224 |

OTHER PUBLICATIONS

Lamb et al., U.S. Appl. No. 10/739,228, titled "CIM Utilities", filed Dec. 17, 2003, 25 pages plus 4 drawing sheets.

"Managing A Storage Array Using CIM Schema 2.7", Revision 0.14, Work-in-Progress Draft, Sep. 13, 2002, pp. 1-35, Storage Networking Industry Association, San Francisco.

"SNIA Storage Management Initiative Specification Version 1.0.1", Sep. 12, 2003, pp. 1-644, Storage Networking Industry Association, San Francisco.

"CIM Tutorial", Jun. 13, 2003, pp. 1-105, Distributed Management Task Force, Portland.

Document dated Jan. 25, 2008 showing prior art cited in corresponding Chinese application having IBM docket No. SJO920030058CN1.

* cited by examiner

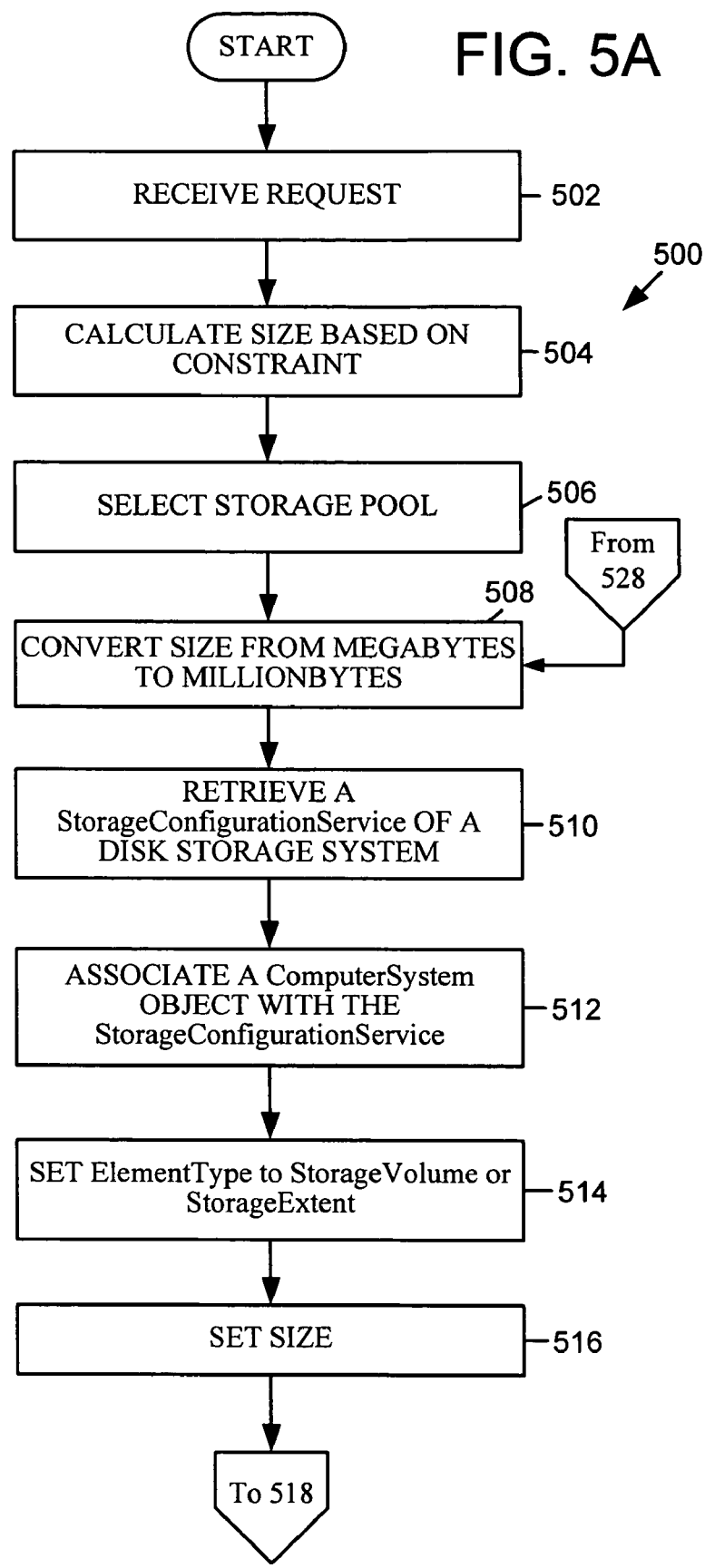

METHOD AND SYSTEM FOR ASSIGNING OR CREATING A RESOURCE

BACKGROUND

1. Technical Field

The present invention relates to management and control of resources in a computing system. More particularly, the invention concerns assigning or creating a resource, such as storage, for a device, such as a host computer.

2. Description of Related Art

Modern computing systems frequently utilize a large number of computing devices, storage devices, and other components. In a common implementation, a Storage Area Network (SAN) is used to connect computing devices with a large number of storage devices. Management and modeling programs may be used to manage these complex computing environments.

Storage Management Initiative Specification (SMI-S)/Bluefin, and Common Information Model (CIM) technologies, are widely used for managing storage devices and storage environments. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), Disks, Storage Subsystems, Switches, and host Computer Systems. (In many, but not all cases, the term "volume" is interchangeable with the term "LUN".) CIM also defines the associations that may or may not exist between these objects, such as a Disk being associated to a Storage Subsystem because it physically resides in the Storage Subsystem.

The CIM Objects mentioned above may be managed by a CIM Object Manager (CIMOM). A storage management software application, such as IBM Tivoli Storage Resource Manager (ITSRM), can use a CIM Client to connect to a CIMOM, to retrieve information about the storage entities that the CIMOM manages, and also to perform active configuration of the storage entities. Storage management software that uses a CIM Client may be called a CIM Client Application.

The SMI-S/Bluefin describes how a current storage LUN is mapped. However, the Logical Unit Number (LUN) Masking and Mapping Profile evolved rapidly from the time that the Bluefin Specification was developed to the present version, which is defined in the SMI-S Public Review Draft SMI-S Version 1.0. As a consequence of the rapid evolution, ITSRM 1.2 and the IBM ESS CIM Server for the IBM Enterprise Storage Server (ESS) support a version of the LUN Masking and Mapping Profile that was "captured" between the Profile's Bluefin definition and the Profile's SMI-S definition. (A CIM Server is a CIMOM and a set of CIM Providers.) Consequently, the IBM ESS CIM Server uses a different masking algorithm than described in the latest SMI-S/Bluefin specification, and different associations are made to map a storage LUN to a particular host. These differences can result in complexity and difficulties.

Although the SMI-S /Bluefin describes several methods for assigning a LUN from a disk storage system to a host or HardwareAccount, or for adding a LUN to a disk storage system, the complexity of the CIM object model makes it difficult for a CIM Client application to simply request storage space in a disk storage system.

For example, the SMI-S/Bluefin describes how to add a LUN to a disk storage system, wherein the method CreateOrModifyElementFromStoragePool( ) in the StorageConfigurationService object is used to create a LUN (or storage volume) given the LUN type, the size of the LUN, a storage pool CIM object path and the StorageConfigurationService. The resulting LUN can then be assigned to a host or several hosts available to the disk storage system. Details of the CreateOrModifyElementFromStoragePool( ) method are as follows:

```
CreateOrModifyElementFromStoragePool
    uint32 CreateOrModifyElementFromStoragePool
    {
        [in, Values {"Unknown", "Reserved", "StorageVolume", "StorageExtent",
        "DMTF Reserved","Vendor Specific"},
            ValueMap {"0", "1", "2", "3", "..", "0x8000.."}] uint16 ElementType;
        [out] CIM_ConcreteJob ref Job,
        [in] CIM_StorageSetting ref Goal,
        [in, out] uint64 Size,
        [in] CIM_StoragePool ref InPool,
        [out, in] CIM_LogicalElement ref Element
    };
```

This method allows an Element of a type specified by the enumeration ElementType to be created from the input Storage Pool. The parameters are as follows: ElementType: This enumeration specifies what type of object to create. At present, only StorageVolume and StorageExtents are defined as values, however other values (such as share) could be added in future.

Job: Reference to the completed job.

Goal: This is the Service Level that the Storage Volume is expected to provide. The setting must be a subset of the Capabilities available from the parent Storage Pool. Goal may be a null value in which case the default setting for the pool will be used.

Size: As an input this is the desired size of the Storage Volume. If it is not possible to create a volume of the desired size, a return code of "Size not supported" will be returned with size set to the nearest supported size.

InPool: This is a reference to a source Storage Pool.

Element: If a reference is passed in, then that Element is modified, otherwise this is a reference to the created element.

Generally, there is substantial complexity when using the CIM object model to create a LUN. For example, the StoragePool object does not have a direct association to the ComputerSystem's StorageConfigurationService, so the StoragePool object has to be first associated to the ComputerSystem, and the ComputerSystem then has to be associated to the StorageConfigurationService to associate a StoragePool to a StorageConfigurationService. Also, because the ComputerSystem can represent more than just a disk storage system, the correct ComputerSystem must be located before making the association to the StorageConfigurationService.

In summary, known techniques for assigning a LUN from a disk storage system to a host or HardwareAccount, and for adding a LUN to a disk storage system, are difficult and overly complex.

SUMMARY

One aspect of the invention is a method for assigning a resource (for example, storage). An example of the method includes receiving a request for a resource (for example, storage), wherein the request includes a list of paths. This example also includes retrieving a HardwareAccount, Controller, and an AccessAuthorization object for a first path in the list of paths. This example further includes making an attach device request to a CIMOM for a first available resource, using the Controller and the AccessAuthorization object. This example also includes determining if the first available resource was successfully attached, and if so, recording the assignment as successful, and if not, rolling back all assignments for the first available resource that were previously recorded as successful.

Another aspect of the invention is a method for creating at least one LUN. An example of the method includes receiving a request to create storage, wherein the request specifies a LUN size and a requested number of LUNs. This example additionally includes selecting a StoragePool object with available space to create the requested number of LUNs. This example further includes retrieving a StorageConfigurationService of a disk storage system using the association of all ComputerSystem objects to the selected StoragePool object, and associating a ComputerSystem object representing the disk storage system with the StorageConfigurationService. This example also includes setting the LUN size equal to a calculated size, and setting the storage pool to be the selected StoragePool object. This example further includes invoking a CreateOrModifyElementFromStoragePool( ) method through the retrieved StorageConfigurationService.

Other aspects of the invention are described in the sections below, and include, for example, a computing system, and a signal bearing medium tangibly embodying a program of machine-readable instructions executable by a digital processing apparatus to perform a method for assigning a resource or for creating at least one LUN.

Some examples of the invention provide one or more of the following advantages:

A higher level client does not need to understand all CIM objects required for LUN assignment.
Parameters used by the higher level client to assign LUNs are simplified.
Errors requiring a roll back of successful PathToLun assignments are not required to be handle by the higher level client.
Multiple assignment requests are allowed by the higher level client.
The higher level client does not need to understand all CIM objects required for LUN creation.
The parameters used by the higher level client to create LUNs are simplified.
Retryable errors are not required to be handled by the higher level client.
Multiple creation requests allowed by the higher level client.

Some examples of the invention also provide a number of other advantages and benefits, which should be apparent from the following description.

BRIEF DESCRIPTION OF THE DRAWINGS

FIGS. 5A and 5B are a flowchart of an operational sequence for creating at least one LUN in accordance with an example of the invention.

DETAILED DESCRIPTION

Figure 1:
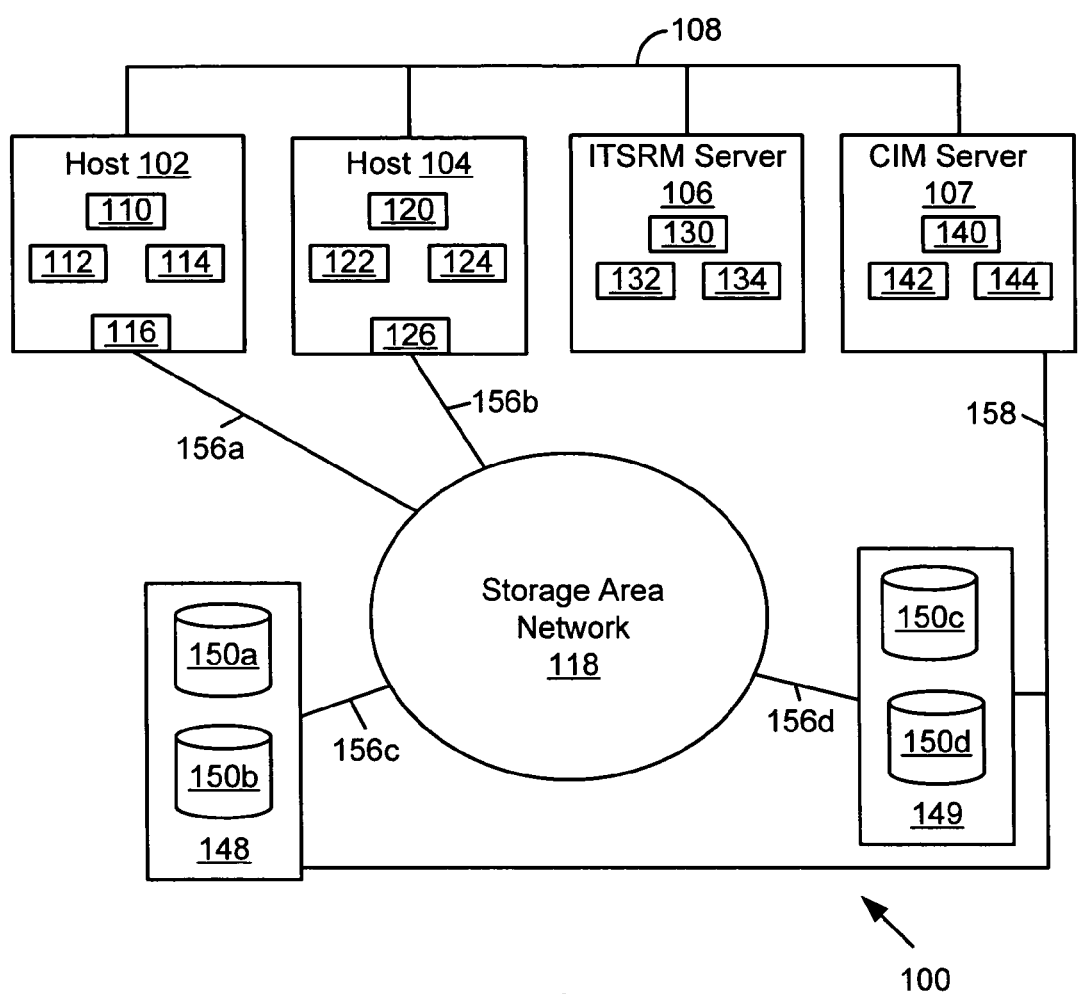
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that can be used for assigning a resource (for example, storage) to a requesting device, and/or for creating at least one LUN. As an example, the computing system may be embodied by all, or portions of, the computing system 100 shown in FIG. 1. The computing system 100 includes a first host 102 and a second host 104. Alternatively, only one host could be included, or additional hosts could be included, and client computers could be included.

The computing system 100 also includes an ITSRM server 106, and a CIM Server 107 (which may also be called a CIM Object Manager (CIMOM)). Each host 102, 104, ITSRM server 106, and the CIM server 107 may run the same or different operating systems, which could be any suitable operating system(s), for example, Windows 2000, AIX, Solaris™, Linux, UNIX, or HP-UX™. Each host 102, 104, ITSRM server 106, and the CIM server 107 may be implemented with any suitable computing device, and may be implemented with the same, or different computing devices. As an example, host 102, host 104, ITSRM server 106, and the CIM server 107 could be a personal computer (having for example, an Intel processor running the Windows or Linux operating system), a computer workstation, a mainframe computer, a supercomputer (for example an IBM SP2 running the AIX operating system), or any other suitable computing device running any suitable operating system. In other examples, the host 102, host 104, ITSRM server 106, and the CIM server 107 could be an IBM xSeries server, or an IBM zSeries Parallel Sysplex server, such as a zSeries 900, running the z Operating System (z/OS), or an IBM S/390 server running OS/390. Host 102, host 104, ITSRM server 106, and/or CIM server 107 could also run Tivoli Storage Manager (TSM), which is available from IBM Corporation. The hosts 102, 104, ITSRM server 106, and the CIM server 107 may be coupled to each other with a network 108, which may be an IP network, and which could be any suitable type of network, for example, Ethernet, ESCON (Enterprise Systems CONnnector), or FICON (FIber CONnector). Additionally, network 108 could use the Internet, and could utilize wireless technology. The hosts 102, 104 need not be coupled to the CIM server 107 via the network 108.

The host 102 has a processor 110 (which may be called a processing device), and in some examples could have more than one processor. As an example, the processor 110, may be a PowerPC RISC processor or an IBM P690 power 4 processor, available from International Business Machines Corporation. In another example, the processor 110 could be a processor manufactured by Intel Corporation. The host 102 also may have a memory subsystem that may include a primary memory 112 (for example RAM), and/or a non-volatile memory 114, both of which are coupled to the processor 110. The memory subsystem may be used to store data and application programs and/or other programming instructions executed by the processor 110. The application programs could generally be any suitable applications. In some examples, embodiments of the method aspects of the invention could run on the host 102. The non-volatile memory 114 could be, for example, a hard disk drive, a drive for reading and writing from optical or magneto-optical media, a tape drive, non-volatile RAM (NVRAM), or any other suitable type of storage. In some examples the primary memory 112 or the non-volatile memory 114 could be eliminated, or the primary memory 112 and/or the non-volatile memory 114 could be provided on the processor 110, or alternatively, external from the host 102. The host 102 also has a hardware bus adapter (HBA) 116, coupled to the processor 110, for coupling the host 102 via connector 156a to a Fibre Channel network (which may be called a "fabric) that may be used to implement a SAN 118. As an example, connector 156a may support FICON (FIber CONnector), ESCON (Enterprise Systems CONnnector) communications channels. As an example, the hardware bus adapter 116 could be a model 2200 hardware bus adapter available from QLogic Corporation. Generally, the SAN 118 may be implemented using Fibre Channel network(s) and/or Ethernet network(s). In other embodiments a SAN need not be included. Using the SAN 118 permits coupling a large number of storage devices to the hosts 102, 104.

Similar to host 102, host 104 has a processor 120, a memory subsystem that that may include a primary memory 122 (for example RAM), and/or a non-volatile memory 124, both of which are coupled to the processor 120. The memory subsystem may be used to store data and application programs and/or other programming instructions executed by the processor 120. The application programs could generally be any suitable applications. In some examples, embodiments of the method aspects of the invention could run on the host 104. The host 104 also has a hardware bus adapter 126, for coupling the host 104 to the SAN 118 via connector 156b.

Similar to hosts 102 and 104, ITSRM server 106 has a processor 130, a memory subsystem that may include a primary memory 132 (for example RAM), and/or a non-volatile memory 134, both of which are coupled to the processor 130. The memory subsystem may be used to store data and application programs and/or other programming instructions executed by the processor 130. The application programs could generally be ITSRM and any other suitable applications. In some examples, embodiments of the method aspects of the invention could run on the ITSRM server 106. In some examples the ITSRM server 106 could have a hardware bus adapter (not shown) and could be coupled to the SAN 118. In some embodiments, the ITSRM server 106 need not be included in the computing system 100.

Similar to hosts 102 and 104, and ITSRM server 106, CIM server 107 has a processor 140, a memory subsystem that may include a primary memory 142 (for example RAM), and/or a non-volatile memory 144, both of which are coupled to the processor 140. The memory subsystem may be used to store data and application programs and/or other programming instructions executed by the processor 140. The application programs could generally be a CIM Object Manager program, and any other suitable applications. In some examples, embodiments of the method aspects of the invention could run on the CIM server 107. In some examples, the CIM server 107 could have a hardware bus adapter (not shown) and could be coupled to the SAN 118. In alternative embodiments, the CIM Server 107 could be embedded in other devices, such as, for example, a storage system 148 or storage system 149 discussed below.

The computing system 100 also may include storage system 148 and storage system 149. Storage devices 150a-b are included in storage system 148, and storage devices 150c-d are included in storage system 149. The storage systems 148, 149 could include additional storage devices. Generally, a large number of storage systems may be coupled to the SAN 118. Storage devices that are not in storage systems could be coupled directly to the SAN 118, or could be coupled to the SAN 118 through a switch (not shown). The storage devices 150a-d are coupled to hosts 102, 104 through the SAN 118, via connectors 156a-d. As an example, connectors 156a-d could support FICON (FIber CONnector) or ESCON (Enterprise Systems CONnnector) communications channels. However, other types of connections could be used. Each storage system 148, 149 has a storage controller (not shown) and is coupled to the SAN 118 through a network adapter (not shown). There may be multiple paths to the storage systems 148, 149 in the SAN 118. In alternative embodiments, computing environments that include storage systems but that do not include a SAN could be used. The CIM server 107 is coupled to the storage systems 148, 149 via the network 158, which may be an IP network, and which could be any suitable type of network, for example, Ethernet, ESCON (Enterprise Systems CONnnector), or FICON (FIber CONnector). Additionally, network 158 could use the Internet, and could utilize wireless technology.

The plurality of storage devices 150a-d may include, for example, hard drives. However, each of the storage devices in the plurality of storage devices could be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, a tape library, EPROMs, EEPROMs, RAM, Non-Volatile RAM, and flash memory. Additionally, CD-R, WORM, DVD-R, and/or DVD+R devices could be included in the plurality storage devices. As an example, one or more of the storage systems 148, 149 could be implemented with a Model F20 or Model 800 Enterprise Storage Server, available from IBM Corporation. As another example, disk storage could be implemented with an IBM FAStT 900, and a tape library could be implemented with an IBM 3494 tape library using IBM 3590 drives, all of which are available from IBM Corporation.

Figure 2:
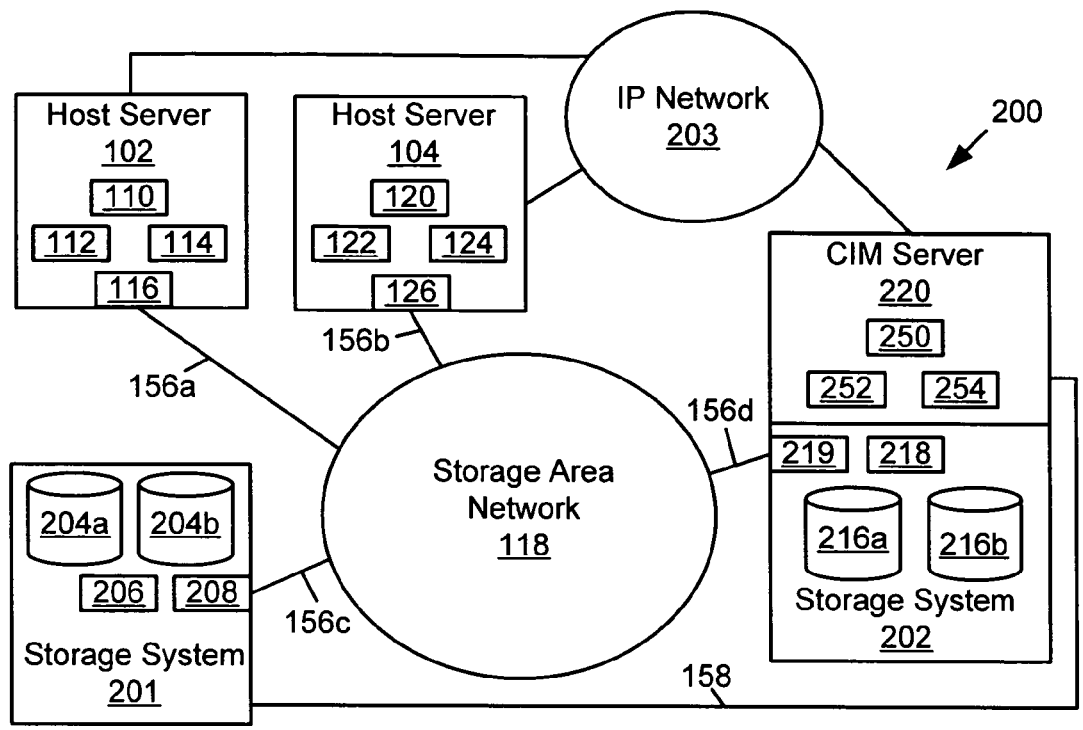
FIG. 2 is a block diagram of the hardware components and interconnections of a computing system in accordance with an example of the invention.

An alternative computing system 200 is shown in FIG. 2. All or portions of the computing system 200 could be used to implement one or more examples of the invention. Computing system 200 includes host servers 102, 104, storage systems 201, 202, SAN 118, and IP network 203. Storage system 201 includes storage devices 204a, 204b, storage controller 206, and hardware bus adapter 208. The storage devices 204a-b may be any of the types of storage devices discussed above with regard to storage devices 150a-d. Storage system 202 includes storage devices 216a, 216b, storage controller 218, and hardware bus adapter 219. The storage devices 216a-b may be any of the types of storage devices discussed above with regard to storage devices 150a-d. Storage system 202 further includes embedded CIM server 220. Thus, computing system 200 does not have a proxy CIM server, and the CIM server 220 is embedded in the storage system 202.

CIM Server 220 has a processor 250, a memory subsystem that may include a primary memory 252 (for example RAM), and/or a non-volatile memory 254, both of which are coupled to the processor 250. The memory subsystem may be used to store data and application programs and/or other programming instructions executed by the processor 220. The application programs could generally be a CIM Object Manager program, and any other suitable applications. In the computing system 200, hosts 102, 104 and the CIM server 220 in storage system 202 are coupled through the IP network 203. IP network 203 may use any suitable type of communications channel technology, for example, Ethernet, ESCON (Enterprise Systems CONnnector), FICON (FIber CONnector). Additionally, network 203 could use the Internet, and could utilize wireless technology. Further, the CIM server 220 is coupled to the storage system 201 via the network 158, which may be an IP network, and which could be any suitable type of network, for example, Ethernet, ESCON (Enterprise Systems CONnnector), or FICON (Fiber CONnector). Additionally, network 158 could use the Internet, and could utilize wireless technology.

II. Operation

In addition to the hardware embodiments described above, other aspects of the invention concern methods for assigning a resource (for example, storage) to a requesting device, and for creating at least one LUN.

A. Signal-Bearing Media

In the context of FIGS. 1 and 2, the method aspects of the invention may be implemented, for example, by having the host 102, the host 104, the ITSRM Server 106, and/or the CIM server 107 (or the CIM Server 220) execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform a method for assigning a resource (for example, storage) to a requesting device, or for creating at least one LUN.

Figure 3:
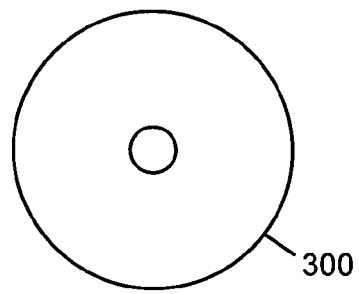
FIG. 3 is an example of a signal-bearing medium in accordance an example of the invention.

This signal-bearing medium may comprise, for example, primary memory 112 and/or non-volatile memory 114, primary memory 122 and/or non-volatile memory 124, primary memory 132 and/or non-volatile memory 134, primary memory 142 and/or non-volatile memory 144, and/or primary memory 252 and/or non-volatile memory 254. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD–RW, or DVD+RW. Additionally, whether contained in the computing system 100 or 200, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", or may comprise Java bytecode.

B. Overall Sequence of Operation

For ease of explanation, but without any intended limitation, the method aspects of the invention are described with reference to the computing system 100 described above and shown in FIG. 1.

FIRST EXAMPLE OF METHOD ASPECT OF THE INVENTION

Figure 4A:
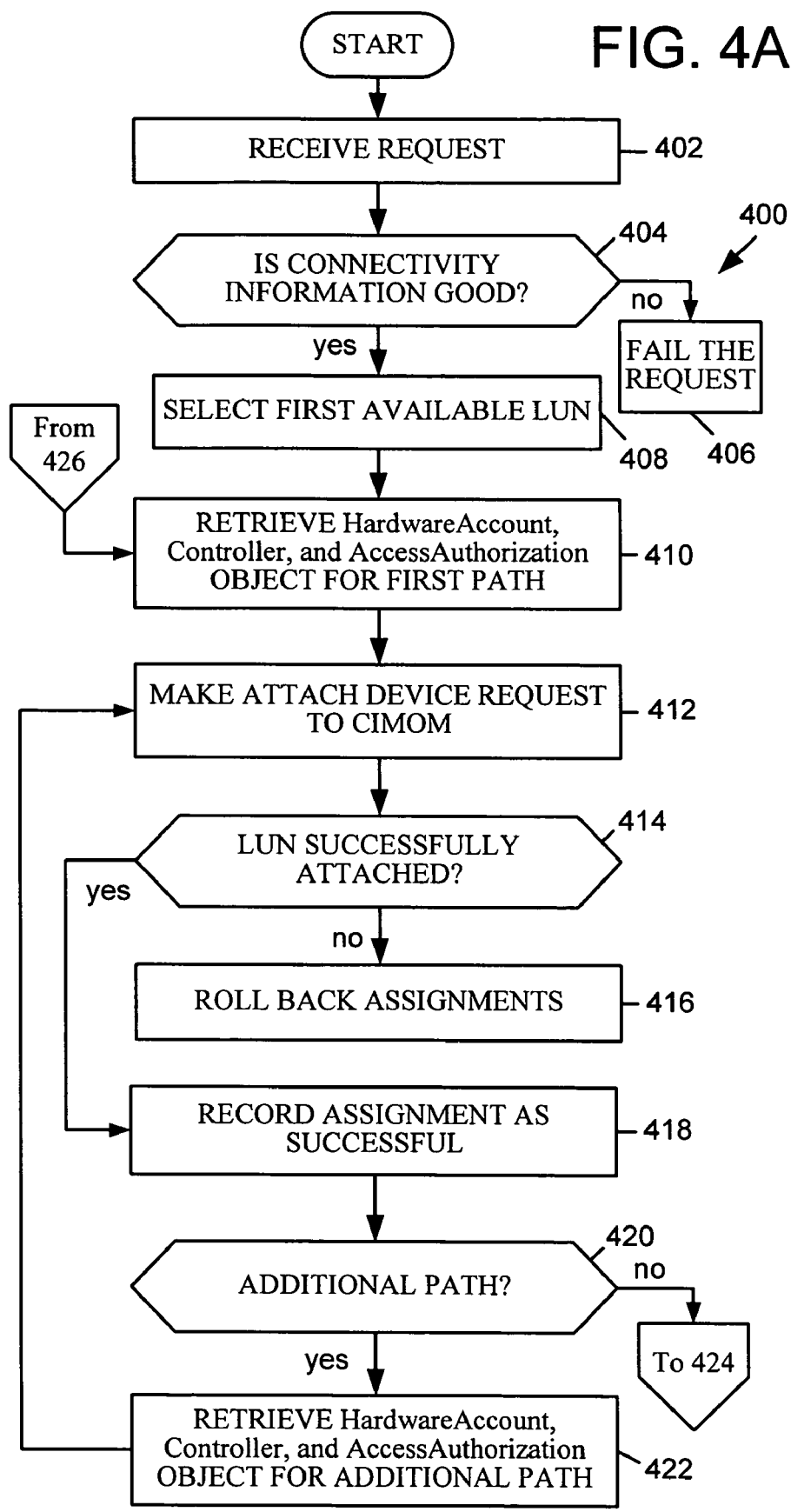
FIGS. 4A and 4B are a flowchart of an operational sequence for assigning a resource in accordance with an example of the invention.
Figure 4B:
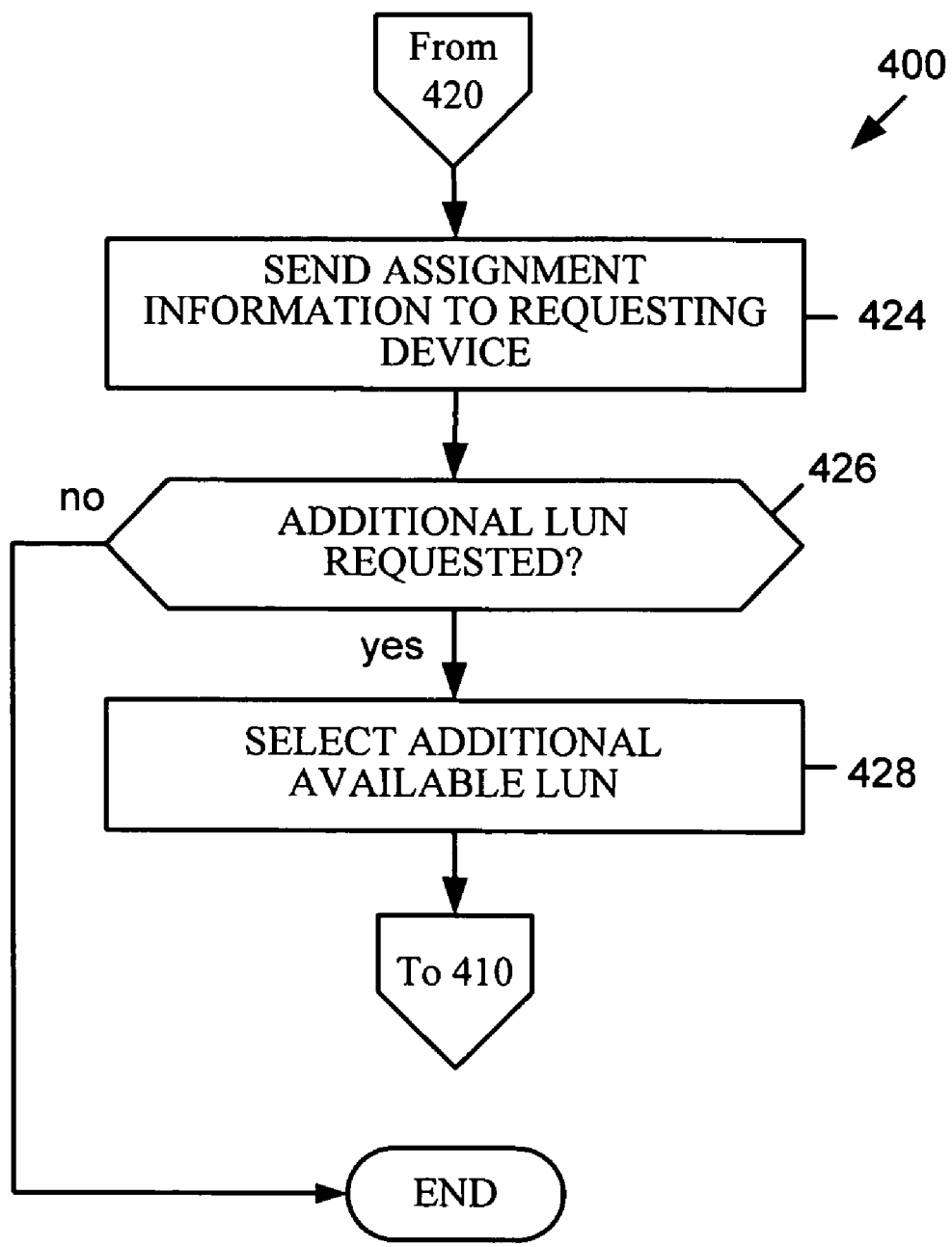

A first example of the method aspect of the present invention is illustrated in FIGS. 4A and 4B, which show a sequence 400 for a method for assigning a resource, which may be, for example, storage. The resource may generally be any resource in a computing system. Assigning a resource (or storage) may also be called mapping a resource (or storage). Some examples of the method may also be described as a method for provisioning a resource, by providing a new resource that meets the requirements of a caller and mapping the new resource (such as storage) to a desired entity (such as a host) in the SAN 118. The sequence 400 could be performed by host 102, host 104, ITSRM server 106, CIM server 107, or by some other computing device. Referring to FIG. 4A, the sequence 400 may include, and begin with, operation 402 which comprises receiving a request for a resource (for example, storage), wherein the request includes a list of paths. The request may also include a requested number of LUNs. The request may also include a requested amount of storage space. The request may also specify a storage pool or storage pools from which it is desired that the storage be assigned from.

As an example, the request may be made by a CIM Client Application. The CIM Client Application may make the request, for example, in response to a requesting device (such as host 102 or host 104), asking for a file system extension, which is a request for additional storage to make a file system larger. Alternatively, the CIM Client Application could make the request in response to a manual submission from a user, or in response to an automated process associated with an external tool, asking for storage, for example, based on a report.

Connectivity information may be used to generate the list of paths. Connectivity information is the information needed to connect a model LUN, to the requesting device. A model LUN is a LUN anywhere in the SAN 118 that can be connected to the requesting device. Thus, an existing LUN connected to the SAN 118 can be used to map an available LUN. This may be accomplished by retrieving the host paths to the model LUN. For example, a path to a model LUN may include the target Fibre Channel Port of the path on a disk storage system, and the World Wide Name (WWN) of the host port adapter or HardwareAccount. This eliminates the need to create a cloned controller and a new HardwareAccount. Consequently, only the AttachDevice method in the AuthorizationService object need be used to map a storage volume (or LUN) to all of the host paths from the model LUN. As described below, the AttachDevice method may then be called using the controller, the LUN, and the Authorization-Service. A successful attachment then allows the host to use the LUN.

Sequence 400 may also include operation 404, which comprises determining if connectivity information is good, and if it is determined that the connectivity information is not good, then the sequence 400 may also include operation 406 which comprises failing the request. If the connectivity information is good, sequence 400 may include operation 408, which comprises selecting a first available LUN from all LUNs in a SAN that are accessible by a requesting device (such as host 102 or host 104). Alternatively, the first available LUN may be selected from all LUNs in a storage pool that are accessible by the requesting device. A best fit algorithm may be used for selecting the first available LUN.

Sequence 400 may also include operation 410, which comprises retrieving a HardwareAccount, Controller, and an AccessAuthorization object for a first path in the list of paths. Sequence 400 may also include operation 412, which comprises making an attach device request to a CIMOM for a first available resource (for example, a first available LUN), using the Controller and the AccessAuthorization object.

Sequence 400 may also include operation 414, which comprises determining if the first available resource (for example, the first available LUN) was successfully attached, and if not, the sequence 400 may also include operation 416, which comprises rolling back all assignments for the first available resource (for example, the first available LUN) that were previously recorded as successful. If the first available resource (for example, the first available LUN) was successfully attached, the sequence 400 may also include operation 418 which comprises recording the assignment as successful.

Sequence 400 may further include operation 420, which comprises determining if there is an additional path in the list of paths, and if so, the sequence 400 may also include operation 422 which comprises retrieving a HardwareAccount, Controller, and an AccessAuthorization object for an additional path in the list of paths, and may also include repeating operations 412 and 414 for the first available LUN using the additional path (which may be called a second path). The operations discussed in this paragraph may be repeated until there are no additional paths.

If in operation 420 it is determined that there is no additional path in the list of paths, then sequence 400 may include operation 424, which comprises sending assignment information to a requesting device (for example host 102 or host 104). Thus, assignment information is sent to the requesting device for the first available LUN after the first available LUN is successfully attached using each path in the list of paths. Sequence 400 may also include operation 426, which comprises determining if an additional resource (for example an additional LUN) is requested. If in operation 426 it is determined that no additional LUN is requested then the sequence 400 may end.

If in operation 426 it is determined that an additional LUN is requested, then sequence 400 may include operation 428, which comprises selecting an additional available LUN (which may be called a second available LUN). A best fit algorithm may be used for selecting the additional available LUN. After selecting the second available LUN, sequence 400 may also include repeating operation 410 (retrieving a HardwareAccount, Controller, and AccessAuthorization object for the first path for the second available LUN), and may include repeating operation 412 (making an attach device request to a CIMOM) and operation 414 (determining if the second LUN was successfully attached for the second available LUN). If in operation 414 it is determined that the second available LUN was not successfully attached, then the sequence 400 may also include operation 416 (which comprises rolling back all assignments for the second LUN that were previously recorded as successful).

Operation 420 (determining if there is an additional path in the list of paths) may also be performed, and if in operation 420 it is determined that there is an additional path in the list of paths, the sequence 400 may also include operation 422 which comprises retrieving a HardwareAccount, Controller, and an AccessAuthorization object for an additional path in the list of paths. If there is an additional path, operations 412 and 414 may be performed for the second available LUN using the additional path (which may be called a second path). The operations discussed in this paragraph may be repeated until there are no additional paths.

If in operation 420 it is determined that there is no additional path in the list of paths, then operation 424, which comprises sending assignment information to a requesting device (for example host 102 or host 104) may be performed for the second available LUN. Thus, assignment information is sent to the requesting device for the second available LUN after the second available LUN is successfully attached using each path in the list of paths. Sequence 400 may also include operation 426, which comprises determining if an additional resource (for example an additional LUN) is requested. If another additional LUN is requested (a third LUN), then operations may be repeated as described above for the second LUN. If in operation 426 it is determined that no additional LUN is requested then the sequence 400 may end.

The preceding method may be called a method for assignment of LUNS through abstraction of CIM Objects. The complexity of CIM object model makes it difficult for a CIM Client application to simply request storage space in a disk storage system, so the mid-level abstraction of the steps to create a LUN on a disk storage system, described herein, was created to make it easier to request storage space for one to many LUNS on different disk storage systems. This makes it possible for the caller of the mid-level abstraction to know little or nothing of the CIM object model. Thus, a CIM Client application that requests a number of available LUNs to be assigned through the CIMOM server does not require knowledge of the CIM objects and their associations in the CIMOM. Using this mid level abstraction of LUN assignment in the CIMOM, a caller need only supply the assignment parameters for the LUN(s). Thus, a CIM Client Application is able to assign available LUNs with little or no knowledge of the CIM objects, by interfacing with the mid-level abstraction of CIM LUN assignment. For example, the CIM Client Application passes a list of paths to a model LUN, and the mid-level abstraction then assigns the available LUN using the attach device method for each path that was passed. If a failure occurs, all paths that were successfully assigned will be masked or "detached".

Examples of the invention may include one or more of the following operations: A request to assign an amount of available LUNs on a supported disk storage system is passed to a CIM Client Application. A list of paths to a model LUN is abstracted from a model LUN that is passed to a CIM Client Application. For each available LUN, the paths and the available LUN is passed to the mid-level abstraction for LUN assignment. For each path, the HardwareAccount, Controller, and AccessAuthorization object is retrieved. Given the Controller, the available LUN, and the AccessAuthorization object, an attach device request is made to the CIMOM. If the attach device fails, all prior successful assignments for the available LUN are rolled back and the assignment fails. The successful assignments are recorded until all assignments are successful. The newly assigned LUN is then returned with its assignment complete and the next available LUN is assigned in the same way. If any of the assignments of available LUNs fail, all successful assignments may be rolled back, resulting in an overall assignment failure.

The following are examples of some higher level method calls that may be used to implement some examples of the invention:

assign( )—Given a volume from a disk storage system and the corresponding PathsToLun of a model Lun on the same disk storage system, assign the volumes exactly as the model Lun.

unassign( )—Given a volume from a disk storage system that had been successfully assigned and the corresponding PathsToLun of a model Lun on the same disk storage system, unassign the volumes from all PathsToLun. Unassigning may also be called masking.

Some examples of the invention provide one or more of the following benefits: A CIM Client Application's code for assignment of available LUNs in a CIMOM is simplified. Knowledge of CIM may be limited to assign parameters. No knowledge of the PathToLun attributes and the way in which a LUN is assigned using the many PathToLun objects is required. A CIM Client Application is permitted to request the assignment of available LUNs given a single list of paths to a model LUN. Rather than attempting assignment on all possible paths, the list of paths limits where the assignment may occur. Lower-level CIM Client API calls can be modified to use different versions of the Bluefin/SMI-S LUN Masking and Mapping Model, and the CIM Client Application can code to the abstraction layer with no knowledge of the changes.

SECOND EXAMPLE OF METHOD ASPECT OF THE INVENTION

Figure 5B:
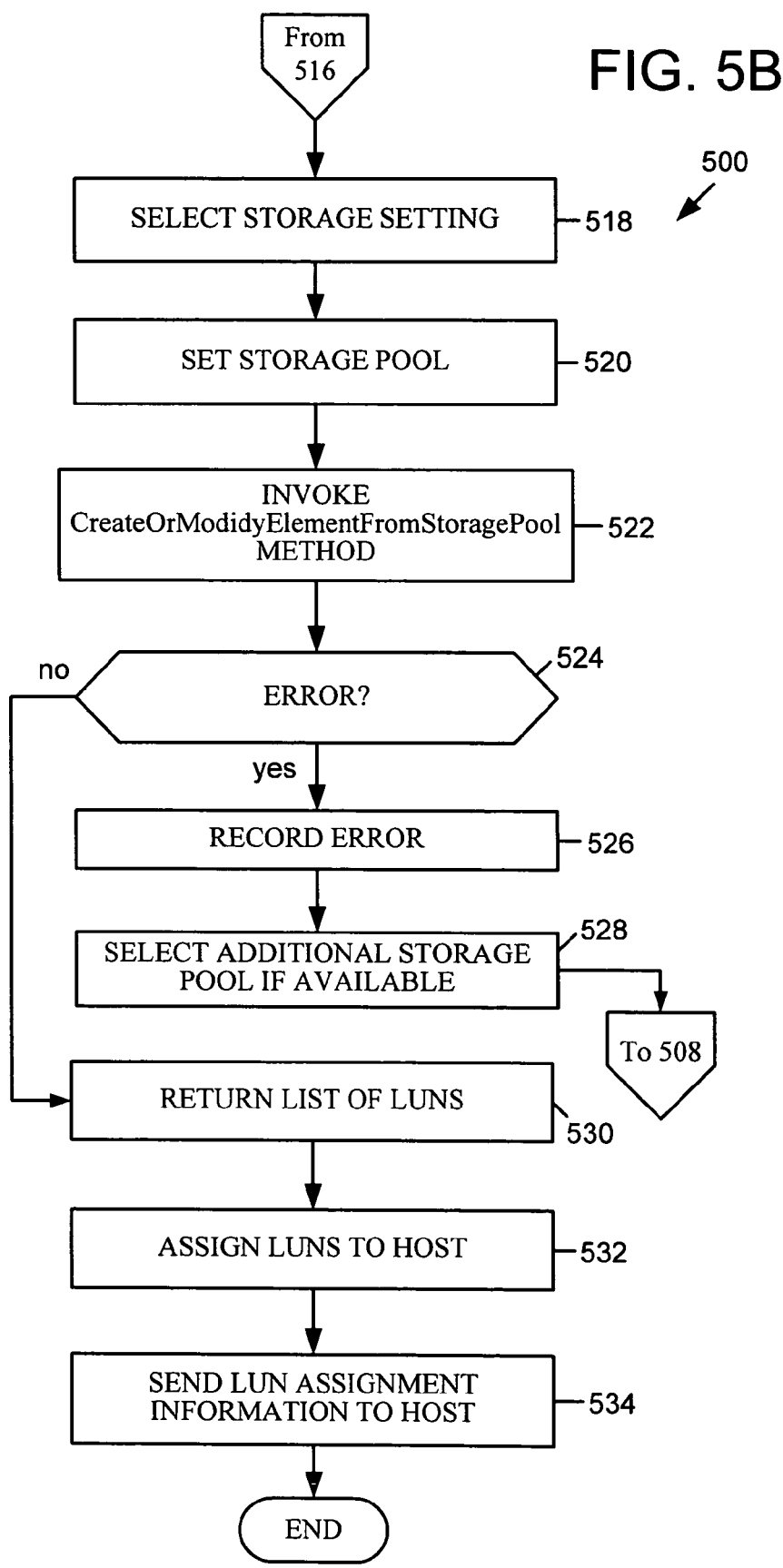

A second example of the method aspect of the present invention is illustrated in FIGS. 5A and 5B, which show a sequence 500 for a method for creating at least one LUN. The sequence 500 could be performed by host 102, host 104, ITSRM server 106, CIM server 107, or by some other computing device. Referring to FIG. 5A, the sequence 500 may include, and begin with, operation 502 which comprises receiving a request to create storage, wherein the request specifies a LUN size and a requested number of LUNs. The receiving operation may also include receiving a list of storage pools. The sequence 500 may also include operation 504, which comprises calculating LUN size based on a size constraint passed by the caller. The size may also be based on a constraint of a disk storage system.

Sequence 500 may also include operation 506, which comprises selecting a StoragePool object with available space to create the requested number of LUNs. Sequence 500 may also include operation 508, which comprises converting the calculated size from megabytes to million bytes. Sequence 500 may also include operation 510, which comprises retrieving a StorageConfigurationService of a disk storage system using the association of all ComputerSystem objects to the selected StoragePool object. The sequence 500 may also include operation 512, which comprises associating a ComputerSystem object representing the disk storage system with the StorageConfigurationService. Sequence 500 may also include operation 514, which comprises setting an ElementType to a value selected from the set consisting of Storage Volume and StorageExtent. Sequence 500 may also include operation 516, which comprises setting the LUN size equal to a calculated size. Sequence 500 may also include operation 518, which comprises selecting a storage setting based on a desired redundancy. The sequence 500 may also include operation 520, which comprises setting the storage pool to be the selected StoragePool object. The sequence 500 may also include operation 522, which comprises invoking a CreateOrModifyElementFromStoragePool( ) method through the retrieved StorageConfigurationService for each LUN in the requested number of LUNs.

The sequence 500 may further include operation 524, which comprises determining if an error has occurred. If an error has occurred, the sequence 500 may further include operation 526, which comprises recording the error, and may also include operation 528, which comprises selecting an additional StoragePool object with available space to create the at least one LUNs, if an additional StoragePool object with available space is available. If operation 528 is performed, then the sequence 500 may also include repeating the retrieving 510, associating 512, setting the storage pool 520, and the invoking 522 operations, using the additional StoragePool object as the selected StoragePool object. The converting 508, set ElementType 514, set size 516, and select storage setting 518 operations may also be repeated. Operation 524, which comprises determining if an error has occurred may also be performed again, and if there is an error, operation 526, which comprises recording the error, and operation 528, which comprises selecting an additional StoragePool object may also be performed. One or more of operations 508-522 may also be repeated, as described above.

If in operation 524 it is determined that no error has occurred, then the sequence 500 may also include operation 530, which comprises returning a list of LUNs.

Sequence 500 may also include operation 532, which comprises assigning the LUNs on the list of LUNs to a requesting host. Sequence 500 may further include operation 534, which comprises sending LUN assignment information to the requesting host.

The preceding method may be called a method for provisioning new LUNs through the abstraction of CIM objects. The complexity of the CIM object model makes it difficult for a CIM Client application to simply request storage space in a disk storage system, so a mid-level abstraction of the steps to create a LUN on a disk storage system as described herein, was created to make it easier to request storage space, for one or many LUNs on different disk storage systems. This makes it possible for the caller of the mid-level abstraction to know little or nothing of the CIM object model. A CIM Client Application that requests a desired size and number of LUNs to be created through the CIMOM server does not need to have knowledge of the CIM objects and their associations in the CIMOM. Due to the mid level abstraction of LUN creation in the CIMOM, the caller can supply only the creation parameters for the LUN(s). Thus, a CIM Client application may create LUNs with little or no knowledge of the CIM objects, by interfacing with the mid-level abstraction of CIM LUN creation. For example, the application may send only the amount of LUNs to create, the desired size of each LUN, and a list of storage pools in which to create the LUNs. The mid level abstraction may then take further steps to calculate the amount of space needed to create the LUN based on constraints of the specific disk storage system. Furthermore, the mid level abstraction may then take the total amount of space desired and select a suitable storage pool from the storage pool list. Once a storage pool list is selected, the amount of LUNs may be created one at a time using an interface to a CIM Client utility that invokes the CreateOrModifyElementFromStoragePool( ) method.

Thus, a higher level client does not need to understand all CIM objects required for LUN creation; parameters used by the higher level client to create LUNs are simplified; retryable errors do not have to be handled by the higher level client; and the higher level client may make multiple creation requests. Additionally, many examples of the invention will benefit developers working on a CIM Client Application because these examples reduce development time and improve code maintainability, facilitating faster time to market for a CIM Client Application product.

Examples of the invention may include one or more of the following operations: A request to create a certain amount of LUNs on a supported disk storage system for a certain specified size is passed to a CIM Client Application. A list of storage pools in which to attempt creation of the LUNs is then generated. A mid level layer is then called to create a certain amount of LUNs for a specified size given a list of storage pools. The size may be calculated based on an optional constraint that may be passed by the caller, and based on a constraint of the disk storage system. For example, an IBM Enterprise Storage Server (ESS) has an incremental constraint of creating LUNs at a size of 100 million bytes. A storage pool with available space may then be selected to create the LUNs. If necessary, the size to create each LUN is converted from megabytes to million bytes. For example, the IBM ESS creates LUNs in terms where 1 Mb is actually 1,000,000 bytes and not 1,048,576 bytes. Using the selected storage pool, the StorageConfigurationService of the disk storage system is retrieved using the association of all ComputerSystem objects to the selected StoragePool object, and the ComputerSystem object representing the disk storage system is then associated with the StorageConfigurationService. The ElementType may be set to either a StorageVolume or StorageExtent, depending on what is allowed by the disk storage system vendor. For example, the IBM ESS supports the ElementType of "2" or StorageVolume. The size is set to the calculated size in the units supported by the disk storage system vendor. For example, the IBM ESS supports the size to be passed in terms of million byte increments. The storage setting may be selected based on the desired redundancy level, but may be ignored in favor of what the selected storage pool has set. The storage pool is set to the selected storage pool. The CreateOrModifyElementFromStoragePool( ) method may then invoked with these parameters through the retrieved StorageConfigurationService object. If an error occurs, and if there are storage pools wherein the storage creation has not been attempted, the remainder of the storage pool list may be exhausted until the LUNs are created or until no more storage pools are left to attempt a creation request. Each error may be recorded for future referral. If the request is not satisfied, no storage volume objects are returned, which indicates that the create request failed. If the request was satisfied, a list of storage volume objects filled with information obtained from a storage object retrieval tool may be returned. This information can then be used to make the necessary assignments from the LUNs to the host.

The following is an example of a higher level method call that may be used to implement some examples of the invention:

createWithinPoolList( )—Given a list of storage pools, the number of LUNs to create, the desired LUN size to create, return newly allocated LUNs from the given storage pools.

Some examples of the invention provide one or more of the following benefits: Code for CIM Client Applications for creating LUNs in a CIMOM is simplified. A CIM Client Application's knowledge may be limited to access parameters. A request to create LUNs does not require an understanding of disk storage system constraints. Tracking errors for each failure on each storage pool is not necessary. A CIM Client Application is permitted to request the creation of LUNs given a list of storage pools. A single list can be passed to create the desired amount and size of LUNs, rather than attempting creation on each available storage pool. Errors that do occur will not necessarily fail a request, but all errors may be recorded if debugging is required. Generally many examples of the invention permit creating LUNs faster, simpler, and with fewer resources, than would otherwise be required.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer storage medium tangibly embodying a program of machine-readable instructions executable by a digital processing apparatus to perform a method for assigning storage in a SAN to a host, the method comprising the following operations:

retrieving a list of paths to a model LUN, wherein the model LUN is a LUN anywhere in the SAN that can be connected to the host;

receiving a request for storage, wherein the request includes the list of paths;

retrieving a HardwareAccount, Controller, and an AccessAuthorization object for a first path in the list of paths;

making an attach device request to a CIMOM for a first available LUN, using the Controller and the AccessAuthorization object;

determining if the first available LUN was successfully attached, and if so, recording the assignment as successful;

and if not, rolling back all assignments for the first available LUN that were previously recorded as successful;

wherein the request further includes a requested amount of storage space; and wherein if it is determined that the first available LUN was successfully attached on the first path, the operations further comprises repeating the retrieving, making, and determining operations for the first available LUN for a second path in the list of paths.

2. The computer storage medium of claim 1, wherein the request further comprises a requested number of LUNs.

3. The computer storage medium of claim 1, wherein if it is determined that the first available LUN was successfully attached using each path in the list of paths, then the operations further comprise sending assignment information to the host.

4. The computer storage medium of claim 1, wherein the making and determining operations are repeated for a second available LUN.

5. The computer storage medium of claim 4, wherein if it is determined that the second available LUN was successfully attached on the first path, the operations further comprise repeating the retrieving, making, and determining operations for the second available LUN for a second path in the list of paths.

6. The computer storage medium of claim 1, wherein the operations further comprise selecting the first available LUN from all LUNs in the SAN that are accessible by the host.

7. The computer storage medium of claim 6, wherein a best fit algorithm is used for selecting the first available LUN.

8. The computer storage medium of claim 1, wherein the operations further comprise selecting the first available LUN from all LUNs in a storage pool that are accessible by the host.

9. The computer storage medium of claim 8, wherein a best fit algorithm is used for selecting the first available LUN.

10. The computer storage medium of claim 1, wherein the method further comprises the operation of determining if connectivity information is good, and if it is determined that the connectivity information is not good, then the method further comprises the operation of failing the request.

11. A computing system, comprising:
 a memory; and
 a processing device coupled to the memory, wherein the processing device is programmed to perform operations for assigning storage in a SAN to a host, the operations comprising:
 receiving a request for storage, wherein the request includes a requested amount of storage space and a list of paths to a model LUN, wherein the model LUN is a LUN anywhere in the SAN that can be connected to the host;
 retrieving a HardwareAccount, Controller, and an AccessAuthorization object for a first path in the list of paths;
 making an attach device request to a CIMOM for a first available LUN, using the Controller and the AccessAuthorization object;
 determining if the first available LUN was successfully attached,
 and if so, recording the assignment as successful;
 and if not, rolling back all assignments for the first available LUN that were previously recorded as successful;
 wherein the request further includes a requested amount of storage space; and
 wherein if it is determined that the first available LUN was successfully attached on the first path, the operations further comprises repeating the retrieving, making, and determining operations for the first available LUN for a second path in the list of paths.

12. A computing system contains memory and processor, and comprising:
 means for retrieving a list of paths to a model LUN, wherein the model LUN is a LUN anywhere in a SAN that can be connected to a requesting host;
 means for receiving a request for storage, wherein the request includes the list of paths;
 means for retrieving a HardwareAccount, Controller, and an AccessAuthorization object for a first path in the list of paths;
 means for making an attach device request to a CIMOM for a first available LUN, using the Controller and the AccessAuthorization object;
 means for determining if the first available LUN was successfully attached;
 means for recording the assignment as successful; and
 means for rolling back all assignments for the first available LUN that were previously recorded as successful, if the first available LUN was not successfully attached;
 wherein the request further includes a requested amount of storage space; and
 wherein if it is determined that the first available LUN was successfully attached on the first path, the operations further comprises repeating the retrieving, making, and determining operations for the first available LUN for a second path in the list of paths.

13. A method for assigning storage in a SAN to a host, comprising the following operations:
 retrieving a list of paths to a model LUN, wherein the model LUN is a LUN anywhere in the SAN that can be connected to the host;
 receiving a request for storage, wherein the request includes a requested amount of storage space and the list of paths;
 retrieving a HardwareAccount, Controller, and an AccessAuthorization object for a first path in the list of paths;
 making an attach device request to a CIMOM for a first available LUN, using the Controller and the AccessAuthorization object;
 determining if the first available LUN was successfully attached, and if so, recording the assignment as successful;
 and if not, rolling back all assignments for the first available LUN that were previously recorded as successful;
 wherein the request further includes a requested amount of storage space; and
 wherein if it is determined that the first available LUN was successfully attached on the first path, the operations further comprises repeating the retrieving, making, and determining operations for the first available LUN for a second path in the list of paths.

* * * * *